Aug. 22, 1933.  H. C. BEARMAN  1,923,062
MULTIPLE BEAD POSITIONING RING
Filed Nov. 13, 1931
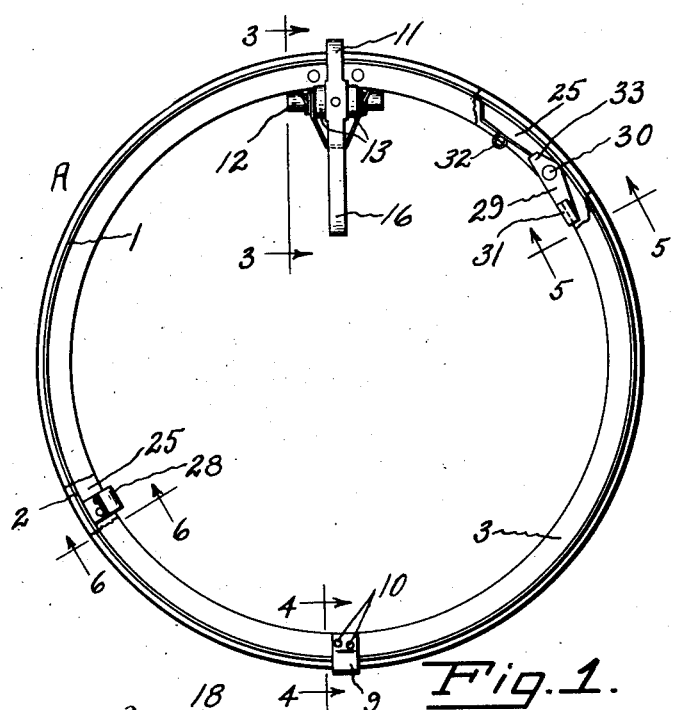
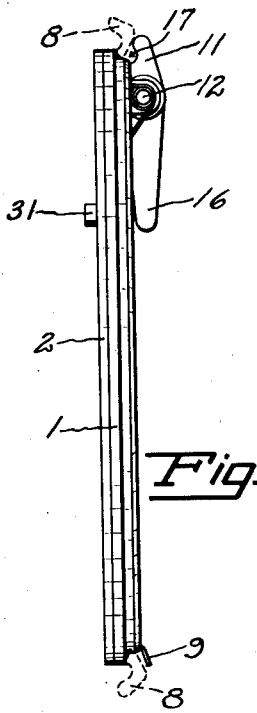
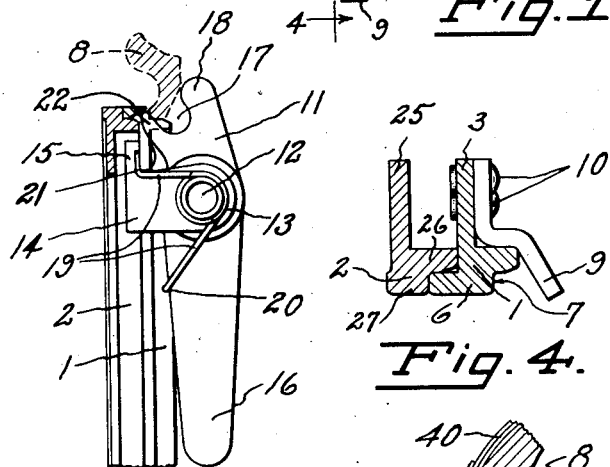
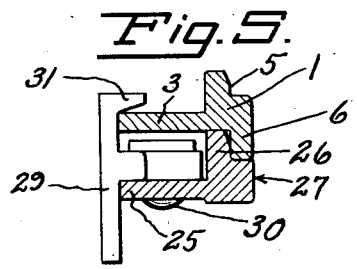
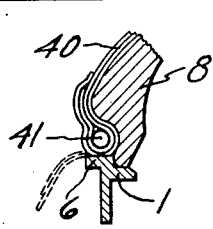
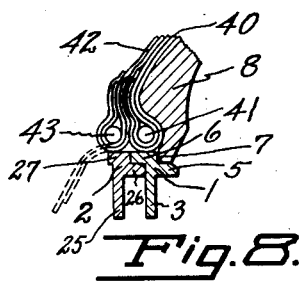
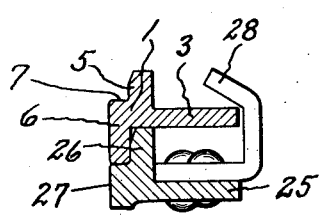
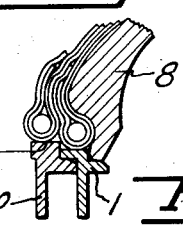
INVENTOR.
BY HARRY C. BEARMAN
*Chapin & Neal*
ATTORNEY.

Patented Aug. 22, 1933

1,923,062

UNITED STATES PATENT OFFICE 1,923,062

MULTIPLE BEAD POSITIONING RING

Harry C. Bearman, Springfield, Mass., assignor to John B. Pierce and Charles A. Dana, as receivers of The Fisk Rubber Company, Chicopee Falls, Mass., a Corporation of Massachusetts Application November 13, 1931
Serial No. 574,789

4 Claims. (Cl. 154—9)

My invention relates to rings used with tire building drums to properly locate the beads adjacent the edges of drum. According to one practice it is customary to construct the tire with a plurality of separate annular indistensible cables or units in the bead portion, each cable or unit being locked into the carcass independently by folding successive carcass plies outwardly and up around the successive units. This practice has militated against the use of bead positioning rings for multi-cable tires since a ring properly designed and proportioned for positioning the inner cable will not accommodate succeeding cables and if designed to accommodate both it interferes with the turning up of the plies around the first cable. It is the object of the present invention to overcome these objections and provide a bead positioning ring suitable for use in constructing multi-cable tires, thereby increasing the uniformity of construction of such tires and a more compact, sturdier construction.

In the accompanying drawing which illustrates one embodiment of my invention,

Fig. 1 is a view of the drum side of my improved bead ring, parts being broken away;

Fig. 2 is an edge view of the ring as viewed from the left of Fig. 1, a portion of the tire building drum being shown in dotted line;

Fig. 3 is a section on a larger scale taken substantially on line 3—3 of Fig. 1 and showing the releasable means for locking the ring to the drum;

Fig. 4 is a section on line 4—4 of Fig. 1;

Fig. 5 is a section on line 5—5 of Fig. 1;

Fig. 6 is a section on line 6—6 of Fig. 1;

Figs. 7 and 8 are diagrammatic views showing the manner of using the ring; and

Fig. 9 is a similar view showing a modified arrangement.

Referring to the drawing, A designates the ring generally, which is made up of two annular members 1 and 2. The member 1 is formed with a web 3, and an inwardly extending drum engaging flange 5 and an outwardly extending bead supporting flange 6. Flange 6 is of greater diameter than flange 5, forming a shoulder 7 adapted to engage the outer edge of the building drum indicated at 8, flange 5 fitting within the drum annulus. Member 1 is held in position on the drum by a fixed lug 9 riveted or bolted as at 10 to the inner surface of the web 3 and adapted to engage behind the edge of the drum as shown in Figs. 2 and 4. Diametrically opposite lug 9 is positioned catch 11 pivoted as at 12 between spaced lugs 13 projecting from and formed integral with a plate 14 riveted or otherwise secured to the inner face of web 3 as at 15. The inner end of catch 11 is elongated to form a handle 16 while the outer end is forked as at 17. When the ring is in position on the drum one member 18 of the fork engages behind the edge of the drum to retain the ring in position, as best shown in Fig. 3. The catch 11 is normally held in locking position by a spring 19 coiled around the pivots 12 and engaging the handle 16 and web 3 at 20 and 21 respectively. As will be clear from Fig. 3, clockwise rotation of handle 16, against the action of spring 19, will release member 18 from the drum and cause the other member 22 to engage the outer face of the drum edge to force disengagement of the ring from the drum.

Member 2 of the ring is formed with a web 25, a flange 26 adapted to engage beneath flange 6 of member 1 and a bead supporting flange 27 the surface of which when the members 1 and 2 are locked together supplements the surface of flange 6. Member 2 is held in operative position with respect to member 1 by a hooked member 28 riveted or otherwise secured to web 25 and adapted to engage over web 3 of member 1, and a catch 29 positioned diametrically opposite hook 28. Catch 29 is pivoted at 30 to web 25 and provided with a hook 31 adapted to engage web 3 under the action of spring 32. Catch 29 is provided with an extension 33 by which the catch can be swung radially inward against the action of spring 32 to release member 2 from member 1.

In Figs. 7 and 8 is illustrated one manner of using my improved bead ring but it will be understood that the ring is not limited to the particular building method illustrated and that the structure of the ring makes it applicable to a wide range of tire building practices.

Referring to Fig. 7, the member 1 has been locked in position on the drum and the first carcass unit 40, which may be one or more plies, stitched or stretched on the drum, the skirt of the unit hanging freely over the edge of the member 1 as shown in dotted line, permitting the bead cable 41 to be placed in position by hand or usual machine operated bead setters, without distortion of the carcass plies. The skirt may then be turned back as shown in full line using conventional stitchers. The element 2 of the bead ring is then clamped to the member 1 as shown in Fig. 8 and a second carcass unit 42 stitched or stretched onto the drum with the skirt positioned as shown in dotted line. The second bead cable 43 is then positioned by hand or with bead setting mechanism and the skirt turned back and stitched into place. The bead positioning ring may then be removed.

Fig. 9 shows a modified structure which illustrates the flexibility of my invention to various building requirements. Where it is desired to stagger the bead cables, for example, the first bead unit is positioned as shown by the ring member 1. For the second cable a member 50 is used similar to member 2 previously described except that the bead supporting surface 51 is of greater diameter, thus positioning the second cable in a staggered or offset position with respect to the first. If, as is customary in such construction, a filler is to be placed beneath the offset cable ring 50 may be removed and the filler stitched in place. As will be obvious, the building operation may be continued using ring members of suitable diameter to position the bead cables as desired and to the number desired.

Having thus described my invention, I claim:

1. A bead positioning ring for use with tire building drums which comprises, a plurality of annular members presenting bead supporting surfaces, each member being of a width and diameter to position one bead unit in predetermined relation with respect to the tire carcass and the other bead units, means to releasably lock each succeeding member to the immediately preceding member in coaxial assembled relation and means to releasably lock the first of said members to the edge of the building drum.

2. A bead positioning ring for use with tire building drums which comprises, an annular member having a flange adapted to fit within the annular edge of the drum and a second flange of larger diameter than the first mentioned flange and forming a bead positioning surface, means to releasably lock said member in operative relation with the drum, a second annular member adapted to be assembled with the first member and having a flange fitting within the bead positioning flange of the first member and provided with a second flange of a diameter to position a second bead unit in predetermined relation to the bead unit positioned by the bead positioning flange of the first member, and means releasably locking the members in assembled relation.

3. A bead positioning ring for use with tire building drums which comprises, an annular member having a flange adapted to fit within the annular edge of the drum and a second flange of larger diameter than the first mentioned flange and forming a bead positioning surface, means to releasably lock said member in operative relation with the drum, a second annular member adapted to be assembled with the first member and having a flange fitting within the bead positioning flange of the first member and provided with a second flange of a diameter to form a continuation of the bead positioning flange of the first member when the members are assembled, and means releasably locking the members in assembled relation.

4. A bead positioning ring for use with tire building drums which comprises, an annular member having a flange adapted to fit within the annular edge of the drum and a second flange of larger diameter than the first mentioned flange and forming a bead positioning surface, means to releasably lock said member in operative relation with the drum at least one additional annular member adapted to be assembled with its preceding member and having a flange fitting within the bead positioning flange of the preceding member and provided with a second flange of a diameter to position another bead unit in predetermined relation to the bead unit positioned by the bead positioning flange of the preceding member, and means for releasably locking the succeeding member to its preceding member in assembled relation therewith.

HARRY C. BEARMAN.